United States Patent
Achan et al.

(10) Patent No.: US 11,915,297 B2
(45) Date of Patent: Feb. 27, 2024

(54) SYSTEMS AND METHODS FOR GENERATING BASKET-AWARE ITEM RECOMMENDATIONS BASED ON DATABASE ENTRY CATEGORIES

(71) Applicant: Walmart Apollo, LLC, Bentonville, AR (US)

(72) Inventors: Kannan Achan, Saratoga, CA (US); Lalitesh Morishetti, Sunnyvale, CA (US); Kaushiki Nag, Sunnyvale, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 272 days.

(21) Appl. No.: 17/588,533

(22) Filed: Jan. 31, 2022

(65) Prior Publication Data
US 2023/0245200 A1    Aug. 3, 2023

(51) Int. Cl.
    *G06Q 30/00*        (2023.01)
    *G06F 16/28*        (2019.01)
    *G06Q 30/0601*      (2023.01)

(52) U.S. Cl.
    CPC ....... *G06Q 30/0631* (2013.01); *G06F 16/287* (2019.01); *G06Q 30/0641* (2013.01)

(58) Field of Classification Search
    CPC .................................................... G06Q 30/00
    See application file for complete search history.

(56) References Cited

U.S. PATENT DOCUMENTS

| | | | |
|---|---|---|---|
| 10,102,278 B2 | 10/2018 | Polonsky et al. | |
| 2011/0066497 A1 | 3/2011 | Gopinath et al. | |
| 2013/0124449 A1 | 5/2013 | Pinckney et al. | |
| 2014/0278896 A1 | 9/2014 | Anand et al. | |
| 2017/0236152 A1* | 8/2017 | Dimaunahan | G06Q 30/0253 705/14.51 |
| 2019/0075187 A1* | 3/2019 | Chokhawala | G06N 20/00 |

OTHER PUBLICATIONS

Richardson, M, "Predicting Clicks: Estimating the Click-Through Rate for New Ads", Microsoft research, Circa 2007. (Year: 2007).*

* cited by examiner

*Primary Examiner* — Mark A Fadok
(74) *Attorney, Agent, or Firm* — Morgan, Lewis & Bockius LLP; Manita Rawat

(57) ABSTRACT

A basket-aware recommendation system can include a computing device configured to receive an indication of a navigation from a user device. The indication includes a user identifier and a set of basket items. The computing device is configured to generate a set of eligible items based on the set of basket items. The computing device is configured to generate a feature representation based on the corresponding item category count within the set of eligible items and select items of the set of eligible items within the corresponding item category. The computing device is configured to compute a number of category display items based on the potential click value and the normalized relevance value. The computing device is configured to transmit the number of category display items for each category of the set of item categories to the user device for display on a user interface.

20 Claims, 5 Drawing Sheets

SYSTEMS AND METHODS FOR GENERATING BASKET-AWARE ITEM RECOMMENDATIONS BASED ON DATABASE ENTRY CATEGORIES

TECHNICAL FIELD

The disclosure relates generally to systems and methods for generating basket-aware recommendations and more particularly to determining a proportional set of recommended items based on basket items and database entries.

BACKGROUND

Customers shop for a variety of different items on ecommerce platforms. For example, customers can visit an ecommerce website on their computing devices or access items for sale through the ecommerce platform using an application on their mobile device. When a user or customer adds items for sale to their basket or cart and is proceeding to purchase those items, an additional opportunity to display suggested items to the user is presented.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The embodiments described herein are directed to a basket-aware recommendation system and related methods. The basket-aware recommendation system can include a computing device that is configured to receive an indication of a navigation from a user device. The indication includes a user identifier and a set of basket items. The computing device is configured to generate a set of eligible items based on the set of basket items, obtain a set of attributes for each item of the set of eligible items, and determine a set of item categories. The computing device is configured to, for each item category of the set of item categories: generate a feature representation based on the corresponding item category count within the set of eligible items and select items of the set of eligible items within the corresponding item category. The computing device is configured to compute a potential click value based on a median click value of each selected item included in the item attributes, compute a normalized relevance value based on a mean relevance of selected items included in the item attributes, and compute a number of category display items based on the potential click value and the normalized relevance value. The computing device is configured to transmit the number of category display items for each category of the set of item categories to the user device for display on a user interface.

In another aspect, the navigation includes, in response to receiving a user selection, prompting the user interface of the user device to display a basket page, displaying the set of basket items.

In another aspect, the computing device is configured to generate the set of eligible items by generating a set of recommended items based on a similarity score between each item stored in an item database and the set of basket items.

In another aspect, the set of attributes of each item of the set of eligible items include an item category, a cost per click value, and a relevance value.

In another aspect, the relevance value is at least one of a relevance to the item category and a relevance to the set of basket items.

In another aspect, the set of item categories include a repurchase category, a low consideration complimentary category, and a high consideration complimentary category.

In another aspect, the computing device is configured to rank the number of category display items for each category of the set of item categories based on the corresponding relevance value.

In various embodiments of the present disclosure, a method of basket-aware recommendations is provided. In some embodiments, the method can include receiving an indication of a navigation from a user device. The indication includes a user identifier and a set of basket items. The method includes generating a set of eligible items based on the set of basket items, obtaining a set of attributes for each item of the set of eligible items, and determining a set of item categories. The method includes, for each item category of the set of item categories: generating a feature representation based on the corresponding item category count within the set of eligible items and selecting items of set of the eligible items within the corresponding item category. The method includes computing a potential click value based on a median click value of each selected item included in the item attributes, computing a normalized relevance value based on a mean relevance of selected items included in the item attributes, and computing a number of category display items based on the potential click value and the normalized relevance value. The method includes transmitting the number of category display items for each category of the set of item categories to the user device for display on a user interface.

In various embodiments of the present disclosure, a non-transitory computer readable medium is provided. The non-transitory computer readable medium can have instructions stored thereon, wherein the instructions, when executed by at least one processor, cause a device to perform operations that include receiving an indication of a navigation from a user device. The indication includes a user identifier and a set of basket items. The operations include generating a set of eligible items based on the set of basket items, obtaining a set of attributes for each item of the set of eligible items, and determining a set of item categories. The operations include, for each item category of the set of item categories: generating a feature representation based on the corresponding item category count within the set of eligible items and selecting items of set of the eligible items within the corresponding item category. The operations include computing a potential click value based on a median click value of each selected item included in the item attributes, computing a normalized relevance value based on a mean relevance of selected items included in the item attributes, and computing a number of category display items based on the potential click value and the normalized relevance value. The operations include transmitting the number of category display items for each category of the set of item categories to the user device for display on a user interface.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The features and advantages of the present disclosures will be more fully disclosed in, or rendered obvious by, the following detailed descriptions of example embodiments. The detailed descriptions of the example embodiments are to be considered together with the accompanying drawings wherein like numbers refer to like parts and further wherein.

In the drawings, reference numbers may be reused to identify similar and/or identical elements.

DETAILED DESCRIPTION

Figure 1:
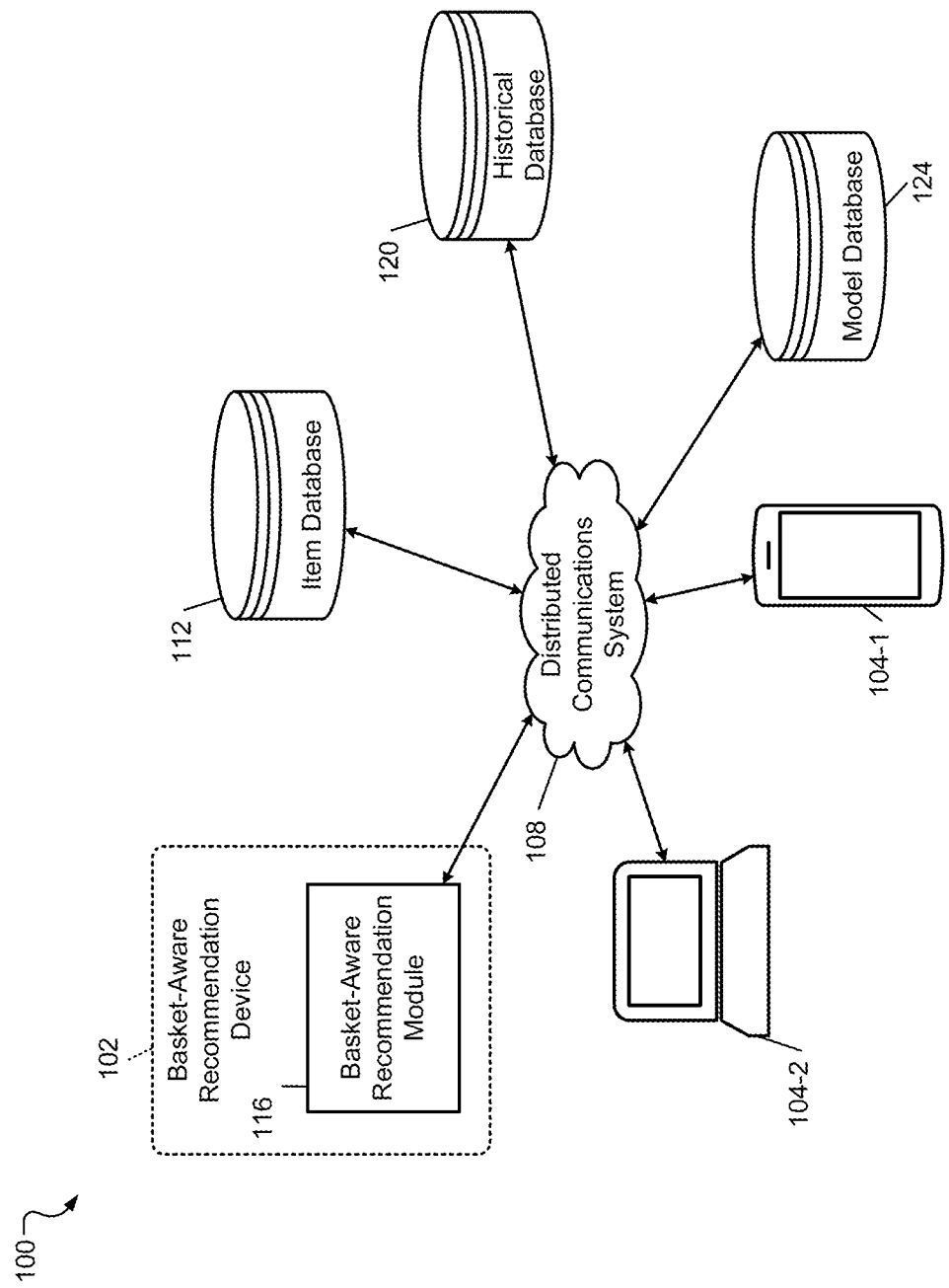
FIG. 1 is a block diagram of a basket-aware recommendation system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "connected," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

A basket-aware recommendation system may be implemented to generate a proportional and balanced set of recommended items to a user when the user is purchasing items or checking out on an ecommerce platform. For example, certain carousels or banners are presented on a variety of different application or webpages advertising certain items when a user is shopping online. The basket-aware recommendation system specifically targets or adjusts those items recommended to the user when the user is checking out based on the user's basket, historical purchases, etc. In particular, the basket-aware recommendation system may select items that are repurchase item, low consideration complimentary items, or high consideration complimentary items to present to the user on a checkout page based on the items in the user's basket.

The basket-aware recommendation can identify items to recommend based on a plurality of recommendation modules or models, such as a relevant recommendation model that identifies sets of items based on a relevancy score compared to items in the user's basket, a complimentary score based on how complimentary particular items are to items in the user's basket, previously purchased items based on how recently the user purchased a particular item, etc. For example, if a user is logged in to an account associated with the ecommerce platform, a recommendation module can access purchase history to identify previously purchased items and determine what items the user may want to repurchase. Further, based on the present items in the user's basket, the basket-aware recommendation system may identify those similar and complimentary items to include in the recommended items on the checkout page as well.

Based on the recommendation items, their relevance, the items the user is purchasing, and likelihood of item selection, the basket-aware recommendation system can determine a balanced and proportional number of items to advertise on the checkout page from the three categories of repurchase items, low consideration complimentary items, and high consideration complimentary items. For example, the user may not be likely to select a large number of items from the repurchase category and may be more interested in complimentary items. Furthermore, high consideration items may be less likely for the user to select because high consideration items tend to be more expensive and involve more research for a user to purchase instead of selecting the item on a checkout page. Therefore, a proportional number from the three categories improves user experience and provides the user with recommendation items that are more directed to the purpose of the present shopping session because the recommended items are more balanced and based on the present basket. More specifically, the basket-aware recommendation system determines a number or percentage of items from each category to recommend on the checkout page based on a total number of items that may be displayed to the user.

Referring to FIG. 1, a block diagram of a basket-aware recommendation system 100 is shown. The basket-aware recommendation system 100 may include a basket-aware recommendation device 102 and user devices 104-1 and 104-2, collectively user device 104, such as a phone, tablet, laptop, mobile computing device, desktop, etc., capable of communicating with a plurality of databases and modules via a distributed communications system 108. The user device 104 may display an ecommerce marketplace via a web browser or an application for customers to view items for sale by the ecommerce marketplace that are stored in an item database 112. For example, a customer may browse a webpage being display on a graphical user interface of the user device 104 and/or submit a query through the graphical user interface of the user device 104 on the ecommerce marketplace through a web browser or application, which retrieves a subset of items from the item database 112 that pertain to the query and displays the subset of items to the customer via the graphical user interface of the user device 104.

The basket-aware recommendation system 100 also includes a basket-aware recommendation module 116. The basket-aware recommendation module 116 receives signals from the user device 104 indicating that, after a shopping session, the user has navigated to a checkout page on an ecommerce platform. For example, if the user is logged into their account, the basket-aware recommendation module 116 can also access historical views, searches, purchases, add-to-carts, etc., from a historical database 120 in order to personalize the checkout page recommendations. Once the basket-aware recommendation module 116 receives the real time signal from the user device 104, the basket-aware recommendation module 116 performs operations to generate a recommended list of items based on items included in the user's basket, which are included in the real time signal.

In various implementations, the basket-aware recommendation module 116 obtains a particular recommendation model from a model database 124 to generate the recommendation list. As noted previously, the recommendation model may generate a set of recommendations based on a relevance or similarity between items of the item database 112 and items in the user's basket, based on whether an item is complimentary to items in the user's basket, and/or based on items recommended to the user for repurchase based on the user's purchase history stored in the historical database 120 (for example, recommending new toothpaste every month or two). In various implementations, the set of recommended items includes features of each item, such as an item category (such as if the item is a repurchase item, a low consideration complimentary item, or a high consideration complimentary item), a cost per click, and a relevance. These item attributes may also be stored in the item database 112.

To determine an appropriate proportion of items per category, the basket-aware recommendation module 116 generates features for each category based on the items in the user's basket and the recommended items in each category. The features for each category may be based on a count of items per category and a mean relevance of the items within the category compared to relevance of items in the basket within the category. Using historical data within each category, including each items click through rate, the basket-aware recommendation module 116 computes a potential cost per click by weighting the median cost per click of the items within the category of the set of recommended items and the median relevance of the items within the category of the set of recommended items. The basket-aware recommendation module 116 further computes a normalized relevance using a minimum-maximum normalization method for the mean relevance of the feature vector of the items within the category of the set of recommended items compared to the set of recommended items.

Using the potential cost per click, the normalized relevance for the category, the category click through rate, and a count as input, the basket-aware recommendation module 116 implements a machine learning algorithm, for example, determining a sigmoid of a multilayer perception representation analysis of the input, to determine a proportion of items of the total number of items to display for each category. The basket-aware recommendation module 116 determines a minimum number of items to show per category based on the determined proportion for the category multiple by a count within the category of the set of recommended items. The minimum number of items for each category represents the number of items within the category to be display to the user on a user interface of the user device on the checkout page.

The basket-aware recommendation device 102 and the user device 104 can be any suitable computing device that includes any hardware or hardware and software combination for processing and handling information. For example, the term "device" and/or "module" can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, the distributed communications system 108. In various implementations, the devices, modules, and databases may communicate directly on an internal network.

As indicated above, the basket-aware recommendation device 102 and/or the user device 104 can be a computer, a workstation, a laptop, a server such as a cloud-based server, or any other suitable device. In some examples, basket-aware recommendation device 102 and/or the user device 104 can be a cellular phone, a smart phone, a tablet, a personal assistant device, a voice assistant device, a digital assistant, a laptop, a computer, or any other suitable device. In various implementations, the basket-aware recommendation device 102 is on a central computing system that is operated and/or controlled by a retailer. Additionally or alternatively, the modules and databases of the basket-aware recommendation device 102 are distributed among one or more workstations or servers that are coupled together over the distributed communications system 108.

The databases described can be remote storage devices, such as a cloud-based server, a memory device on another application server, a networked computer, or any other suitable remote storage. Further, in some examples, the databases can be a local storage device, such as a hard drive, a non-volatile memory, or a USB stick.

The distributed communications system 108 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The distributed communications system 108 can provide access to, for example, the Internet.

Figure 2:
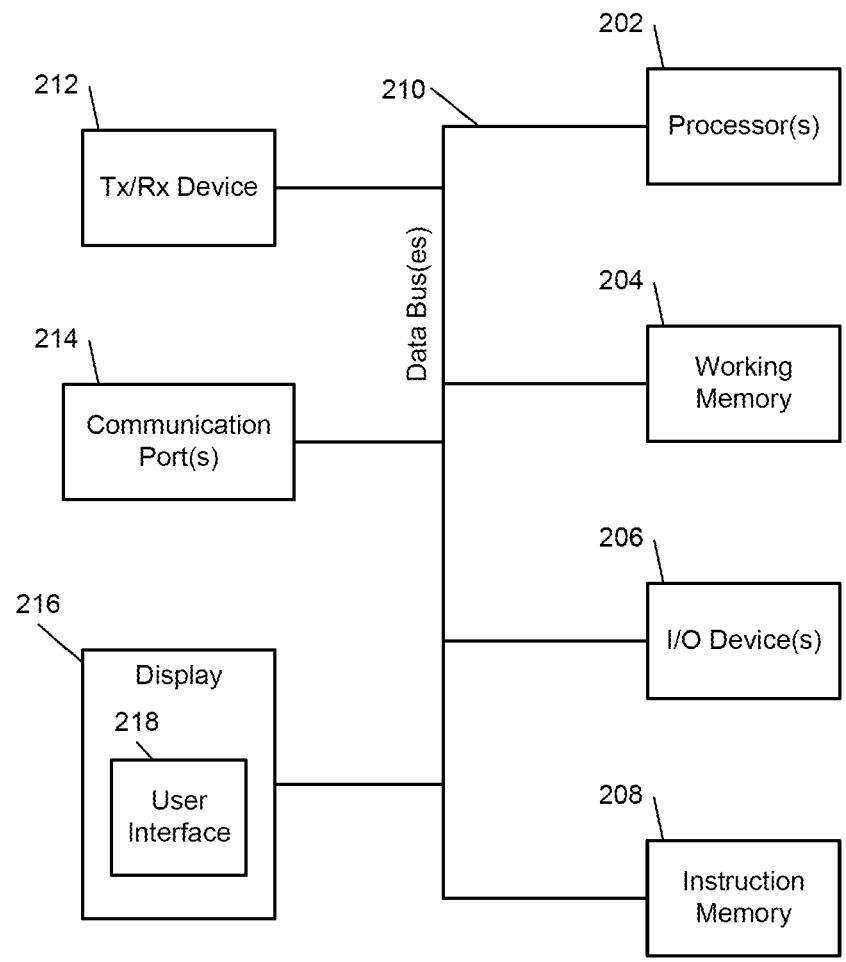
FIG. 2 is a block diagram of a computing device implementing the basket-aware recommendation device of FIG. 1 in accordance with some embodiments.

FIG. 2 illustrates an example computing device 200. The basket-aware recommendation device 102 and/or the user device 104 may include the features shown in FIG. 2. For the sake of brevity, FIG. 2 is described relative to the basket-aware recommendation device 102.

As shown, the basket-aware recommendation device 102 can be a computing device 200 that may include one or more processors 202, working memory 204, one or more input/output devices 206, instruction memory 208, a transceiver 212, one or more communication ports 214, and a display 216, all operatively coupled to one or more data buses 210. Data buses 210 allow for communication among the various devices. Data buses 210 can include wired, or wireless, communication channels.

Processors 202 can include one or more distinct processors, each having one or more cores. Each of the distinct processors can have the same or different structure. Processors 202 can include one or more central processing units (CPUs), one or more graphics processing units (GPUs), application specific integrated circuits (ASICs), digital signal processors (DSPs), and the like.

Processors 202 can be configured to perform a certain function or operation by executing code, stored on instruction memory 208, embodying the function or operation. For example, processors 202 can be configured to perform one or more of any function, method, or operation disclosed herein.

Instruction memory 208 can store instructions that can be accessed (e.g., read) and executed by processors 202. For example, instruction memory 208 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 202 can store data to, and read data from, working memory 204. For example, processors 202 can store a working set of instructions to working memory 204, such as instructions loaded from instruction memory 208. Processors 202 can also use working memory 204 to store dynamic data created during the operation of the basket-aware recommendation device 102. Working memory 204 can be a random access memory (RAM) such as a static random access memory (SRAM) or dynamic random access memory (DRAM), or any other suitable memory.

Input-output devices 206 can include any suitable device that allows for data input or output. For example, input-output devices 206 can include one or more of a keyboard, a touchpad, a mouse, a stylus, a touchscreen, a physical button, a speaker, a microphone, or any other suitable input or output device.

Communication port(s) 214 can include, for example, a serial port such as a universal asynchronous receiver/transmitter (UART) connection, a Universal Serial Bus (USB) connection, or any other suitable communication port or connection. In some examples, communication port(s) 214 allows for the programming of executable instructions in instruction memory 208. In some examples, communication port(s) 214 allow for the transfer (e.g., uploading or downloading) of data, such as data items including feedback information.

Display 216 can display a user interface 218. User interfaces 218 can enable user interaction with the basket-aware recommendation device 102. For example, user interface 218 can be a user interface that allows an operator to select and browse items via the ecommerce website or marketplace. The user interface 218 can, for example, display the items for sale for a user or customer to view as a result of searching or browsing on an ecommerce marketplace. In some examples, display 216 can be a touchscreen, where user interface 218 is displayed on the touchscreen.

Transceiver 212 allows for communication with a network, such as the distributed communications system 108 of FIG. 1. For example, if the distributed communications system 108 of FIG. 1 is a cellular network, transceiver 212 is configured to allow communications with the cellular network. In some examples, transceiver 212 is selected based on the type of distributed communications system 108 in which the basket-aware recommendation device 102 will be operating. Processor(s) 202 is operable to receive data from, or send data to, a network, such as the distributed communications system 108 of FIG. 1, via transceiver 212.

Figure 3:
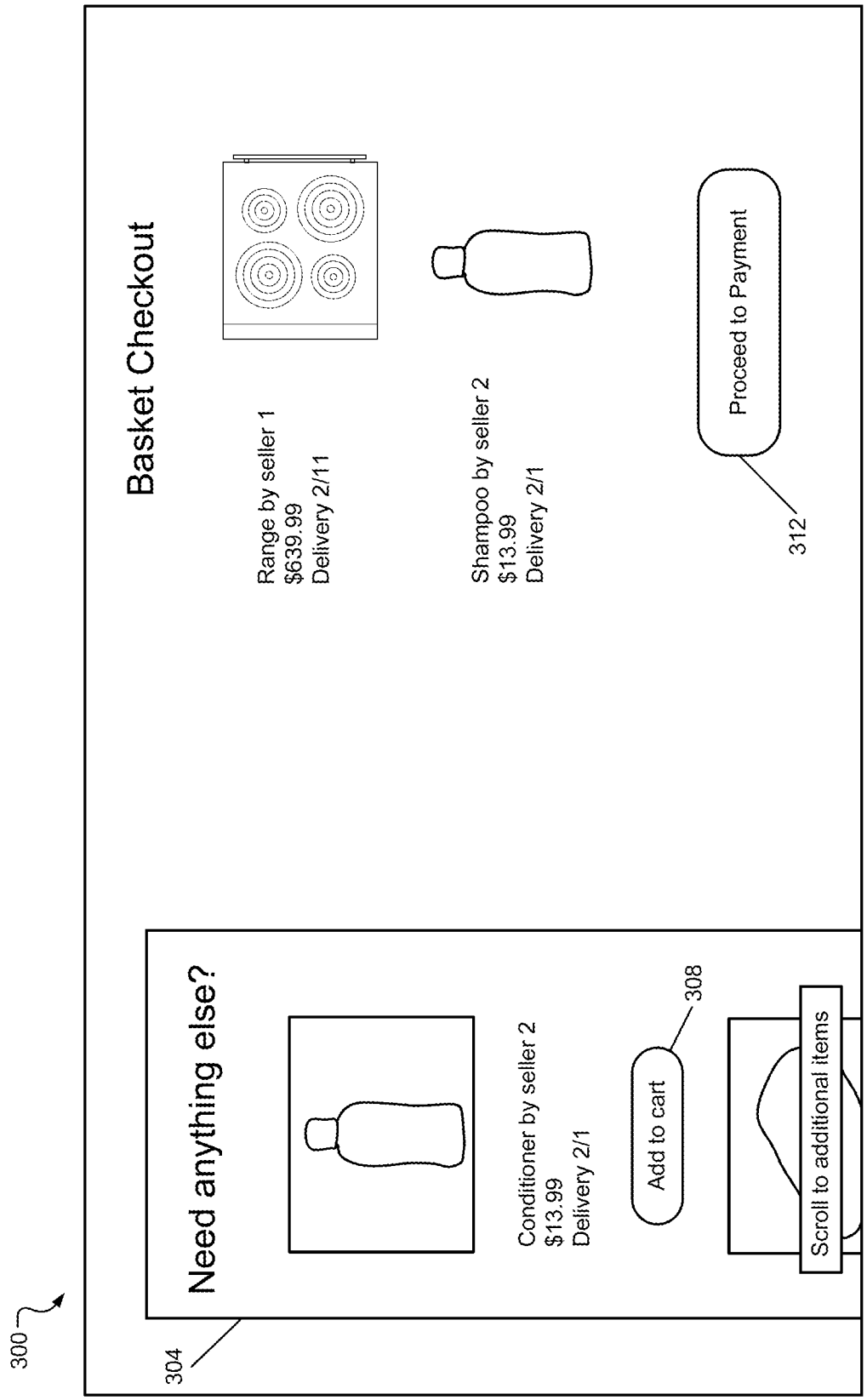
FIG. 3 is an example user interface presenting basket-aware recommendations for a user in accordance with some embodiments.

Referring to FIG. 3, an example user interface 300 presenting basket-aware recommendations for a user is shown. For example, the user interface 300 depicted is presented to a user upon navigating to a checkout page to purchase items in their basket. That is, upon navigating to the user interface 300, real time signals are transmitted to the basket-aware recommendation system 100 indicating the user via user identifier and the items in their basket, prompting the basket-aware recommendation system 100 to generate recommended items to the user that are of a particular proportion across the three categories: repurchased, low consideration complimentary, and high consideration complimentary, as shown in user interface element 304. As is shown, the user is being recommended conditioner, which may be considered a low consideration complimentary item based on the user purchasing shampoo. Additionally or alternatively, the conditioner may be a repurchase item as well. Included in the banner is also soap, which the user may scroll to see additional information about along with additional items. Each recommended item may include a corresponding add to cart button 308, making it easy for the user to add to item to their current basket. The user interface 300 also includes a proceed to payment button 312 if the user is finished browsing the additional recommended items. In various implementations, the user interface element 304 may include a grid displaying each item recommended to the user without the user needing to scroll.

Figure 4:
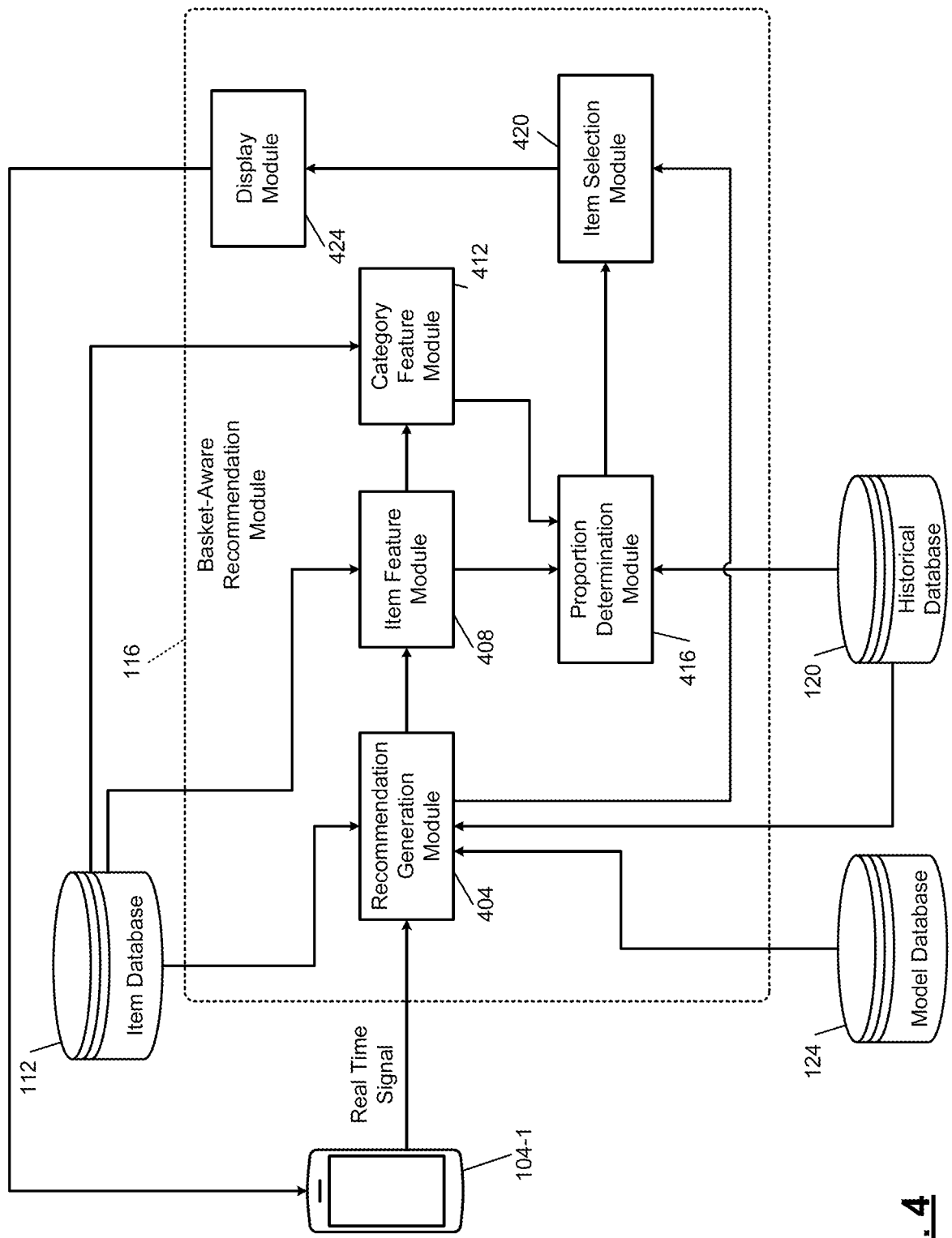
FIG. 4 is a block diagram illustrating an example basket-aware recommendation module of the basket-aware recommendation system of FIG. 1 in accordance with some embodiments.

Referring to FIG. 4, a block diagram illustrating an example basket-aware recommendation module 116 of the basket-aware recommendation system 100 is shown. As described previously, the basket-aware recommendation module 116 is prompted to generate item display numbers for each of the three categories upon receiving a real time signal indicating a user has navigated to a checkout page. The basket-aware recommendation module 116 includes a recommendation generation module 404 that receives the real time signal from the user device 104-1. The real time signal includes a user identifier indicating which user or account is associated with the present shopping session as well as item identifiers indicating which items are in the user's basket. The recommendation generation module 404 identifies selects a recommendation model from the model database 124.

The model database 124 may have a specific recommendation module for the recommendation generation module 404 to use or the recommendation generation module 404 may be configured to select a particular recommendation model. As described previously, the recommendation model may identify a set of recommended items from the item database 112 based on a similarity or relevance compared to items in the user's basket. In various implementations, the recommendation model may also identify complimentary items to add to the set of recommended items based on the items in the user's basket. Additionally, the recommendation model may select items the user may want to repurchase by identifying previously purchased items corresponding to the user identifier stored in the historical database 120.

Once the set of recommended items is generation, the set of recommended items and the items in the user's basket (i.e., corresponding identifiers) are forwarded to an item feature module 408. The item feature module 408 obtains item attributes, for example, from the item database 112, including a category of the item, a cost per click, and a relevance score of the item to the user's basket. The category corresponds to that categories described previously: repurchase, low consideration complimentary, and high consideration complimentary. A category feature module 412 generates a vector representation of features for each category represented in items in the user's basket based on data forwarded from the item feature module 408. The vector representation or feature vector determines, for each category and based on the items in the user's basket, a count of items per category in the user's basket and a mean relevance of items of the user's basket within each category compared to relevance across each category of items.

A proportion determination module 416 receives historical data across each category, including a click through rate for items in the category, the set of recommendation items and corresponding attributes from the item feature module 408, and the feature vector representations for each category from the category feature module 412. The proportion determination module 416 computes, for each category, a number or a percentage of items within each category that should be represented in a total number of items displayed on a checkout page on the user interface of the user device 104-1. As described previously, the proportion determination module 416 computes a potential cost per click, P, for each category according to the following weighting equation:

$$P = \sigma(w_1 * MD_{cpc} + w_2 * MD_r)$$

where $\sigma$, $w_1$, and $w_2$ are weighing constants identified from historical data indicating how much to consider the cost per click value or the median cost per click value for the set of recommended items in the corresponding category ($MD_{cpc}$) and how much to consider or weight the relevance value or the median relevance value for the set of recommended items in the corresponding category ($MD_r$).

The proportion determination module 416 also computes a normalized relevance for each category based on the mean item relevance for items in the category. Using the potential cost per click, the normalized relevance, the corresponding category click through rate, and the corresponding category count as input, the proportion determination module 416 computes an item proportion for the corresponding category. The proportion determination module 416 uses the above features as inputs into a machine learning algorithm, such as a multilayer perceptron and the output of the multilayer perception is used as input to a Sigmoid function to determine a bounded range of the item proportion for the corresponding category. The proportion determination module 416 multiples the item proportion by the item count within the category to determine a number of items within the category to include in the displayed items. In various implementations, the proportion determination module 416 limits the number of items for each category to the total number of item available to be displayed, meaning if a category results in the number of items being above the total number, for example, 20, the proportion determination module 416 may select for the displayed items to only include items in that category.

Once the number of items for each category is determined, the number for each category is forwarded to an item selection module 420. As noted previously, instead of a specific number, a percentage may be determined and forwarded. The item selection module 420 selects, from the set of recommended items generated by the recommendation generation module 404, the number of items for each category to display on the user interface. In various implementations, the item selection module 420 may select items based on a similarity or relevance score to items in the basket. The item selection module 420 may also randomly select or sample items from each category in according with the corresponding number of items for that category. The selected items to be displayed is forwarded to a display module 424. The display module 424 may implement a ranking model or algorithm stored in the model database 124 to rank the display items in order for relevance. The display module 424 then transmits the item display list to the user device 104-1 for display on the user interface. As noted previously, the basket-aware recommendation module 116 may forward, obtain, and transmit item identifiers and the subsequent device (user device 104-1), module, etc., may select item embeddings from the item database 112 for display or attribute analysis.

Figure 5:
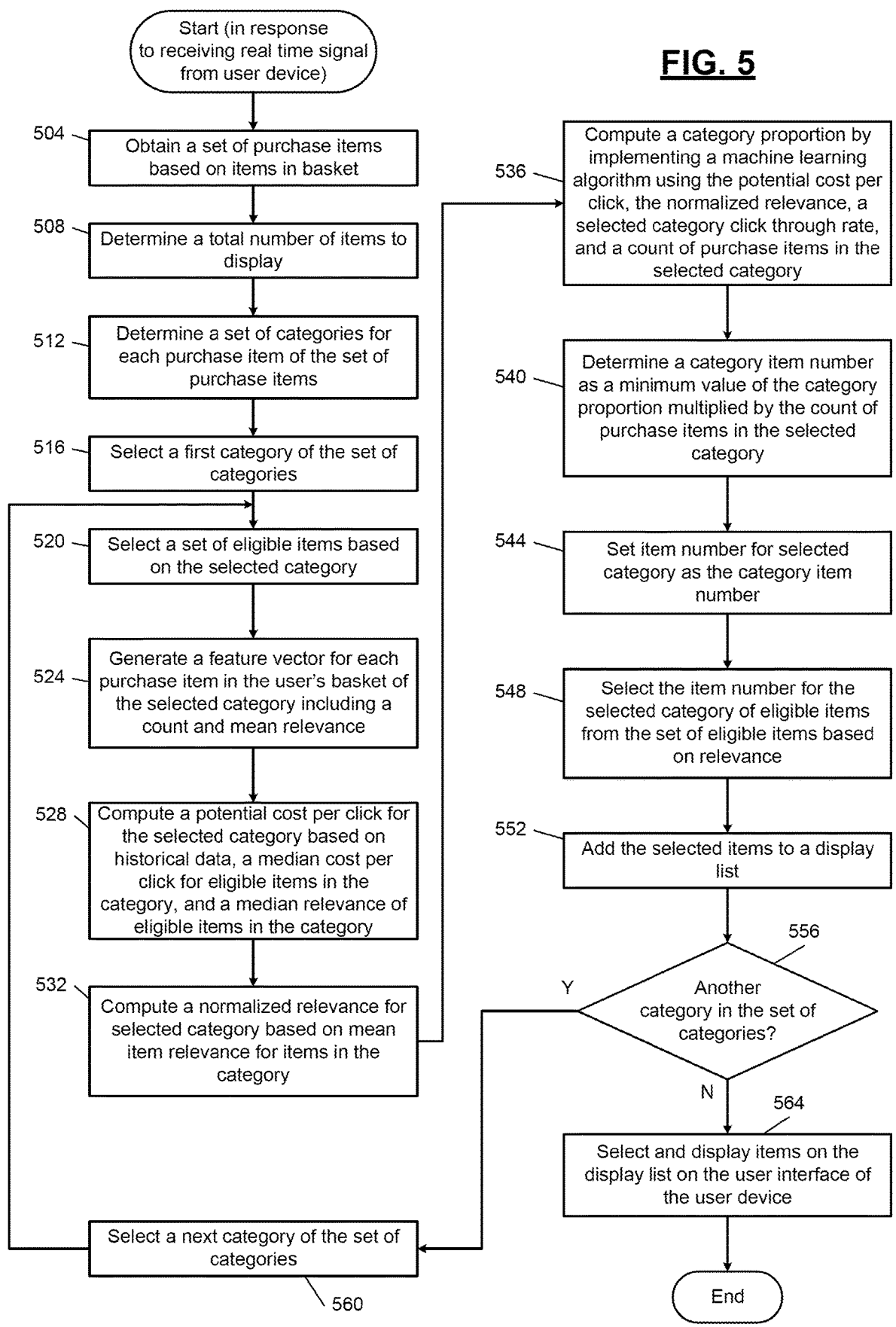
FIG. 5 is a flowchart of example methods of identifying and displaying proportional basket-aware recommendations in accordance with some embodiments.

Referring to FIG. 5, a flowchart of example methods of identifying and displaying proportional basket-aware recommendations is shown. Control begins in response to receiving real time signals from a user device. Control continues to 504 to obtain a set of purchase items based on items in the user basket (as indicated in the real time signal). Control proceeds to 508 to determine a total number of items to display. For example, certain user interfaces on a webpage or application may limit the number of items to display to a user. Control continues to 512 to determine a set of categories for each purchase item of the set of purchase items. In various implementations, the set of categories may be predetermined. Otherwise, control may only use the categories that are represented in the basket. Control continues to 516 to select a first category of the set of categories.

Control proceeds to 520 to select a set of eligible items based on the selected category. In various implementations, control, as described in FIG. 4, may generate a set of recommended items and select items within the selected category from the set of recommended items. As described in the flowchart, control may also identify each eligible item as each item within the selected category. Control continues to 524 to generate a feature vector of the items in the user's basket that are within the selected category including a count of items in the selected category and a mean relevance of the items in the selected category. Control continues to 528 to compute a potential cost per click for the selected category based on historical data, a median cost per click for eligible items in the category, and a median relevance of eligible items in the selected category.

Control proceeds to 532 to compute a normalized relevance for the selected category based on the mean item relevance for items in the category. Control continues to 536 to compute a category proportion by implementing a machine learning algorithm using the potential cost per click, the normalized relevance, a selected category click through rate, and a count of basket items or purchase items in the category. Control continues to 540 to determine a category item number as a minimum value of the category proportion multiplied by the count of the purchase items in the selected category. Control continues to 544 to set the item number for the selected category as the category item number. In various implementations, if the category item number is greater than the total number of items to display, control may set the item number for the selected category to the total number of items to display. Then, control may end as each item slot is taken.

At 548, control selects the item number for the selected category of eligible items from the set of eligible items based on relevance. In various implementations, a relevance score for the set of eligible items may be determined between purchase items and the corresponding eligible item. Control continues to 552 to add the select items for the category to a display list. Control proceeds to 556 to determine if another category is in the set of categories. If yes, control continues to 560 to select a next category of the set of categories and returns to 520. Otherwise, if no, control continues to 564 to select and display items on the display list on the user interface of the user device. Then, control ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The term model as used in the present disclosure includes data models created using machine learning. Machine learning may involve training a model in a supervised or unsupervised setting. Machine learning can include models that may be trained to learn relationships between various groups of data. Machine learned models may be based on a set of algorithms that are designed to model abstractions in data by using a number of processing layers. The processing layers may be made up of non-linear transformations. The models may include, for example, artificial intelligence, neural networks, deep convolutional and recurrent neural networks. Such neural networks may be made of up of levels of trainable filters, transformations, projections, hashing, pooling and regularization. The models may be used in large-scale relationship-recognition tasks. The models can be created by using various open-source and proprietary machine learning tools known to those of ordinary skill in the art.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a computing device configured to:
  receive an indication of a navigation from a user device, the indication including a user identifier and a set of basket items;
  generate a set of eligible items based on the set of basket items;
  obtain a set of attributes for each item of the set of eligible items;
  determine a set of item categories;
  for each item category of the set of item categories:
    generate a feature representation based on the corresponding item category count within the set of eligible items;
    select items of the set of eligible items within the corresponding item category;
    compute a potential click value based on a median click value of each selected item included in the item attributes;
    compute a normalized relevance value based on a mean relevance of selected items included in the item attributes; and
    compute a number of category display items based on the potential click value and the normalized relevance value; and
  transmit the number of category display items for each category of the set of item categories to the user device for display on a user interface.

2. The system of claim 1, wherein the navigation includes, in response to receiving a user selection, prompting the user interface of the user device to display a basket page, displaying the set of basket items.

3. The system of claim 1, wherein the computing device is configured to generate the set of eligible items by generating a set of recommended items based on a similarity score between each item stored in an item database and the set of basket items.

4. The system of claim 1, wherein the set of attributes of each item of the set of eligible items include an item category, a cost per click value, and a relevance value.

5. The system of claim 4, wherein the relevance value is at least one of a relevance to the item category and a relevance to the set of basket items.

6. The system of claim 1, wherein the set of item categories include a repurchase category, a low consideration complimentary category, and a high consideration complimentary category.

7. The system of claim 1, wherein the computing device is configured to rank the number of category display items for each category of the set of item categories based on the corresponding relevance value.

8. A method comprising:
receiving an indication of a navigation from a user device, the indication including a user identifier and a set of basket items;
generating a set of eligible items based on the set of basket items;
obtaining a set of attributes for each item of the set of eligible items;
determining a set of item categories;
for each item category of the set of item categories:
  generating a feature representation based on the corresponding item category count within the set of eligible items;
  selecting items of set of the eligible items within the corresponding item category;
  computing a potential click value based on a median click value of each selected item included in the item attributes;
  computing a normalized relevance value based on a mean relevance of selected items included in the item attributes; and
  computing a number of category display items based on the potential click value and the normalized relevance value; and
transmitting the number of category display items for each category of the set of item categories to the user device for display on a user interface.

9. The method of claim 8, wherein the navigation includes, in response to receiving a user selection, prompting the user interface of the user device to display a basket page, displaying the set of basket items.

10. The method of claim 8, further comprising generating the set of eligible items by generating a set of recommended items based on a similarity score between each item stored in an item database and the set of basket items.

11. The method of claim 8, wherein the set of attributes of each item of the set of eligible items include an item category, a cost per click value, and a relevance value.

12. The method of claim 11, wherein the relevance value is at least one of a relevance to the item category and a relevance to the set of basket items.

13. The method of claim 8, wherein the set of item categories include a repurchase category, a low consideration complimentary category, and a high consideration complimentary category.

14. The method of claim 8, further comprising ranking the number of category display items for each category of the set of item categories based on the corresponding relevance value.

15. A non-transitory computer readable medium having instructions stored thereon, wherein the instructions, when executed by at least one processor, cause a device to perform operations comprising:
- receiving an indication of a navigation from a user device, the indication including a user identifier and a set of basket items;
- generating a set of eligible items based on the set of basket items;
- obtaining a set of attributes for each item of the set of eligible items;
- determining a set of item categories;
- for each item category of the set of item categories:
  - generating a feature representation based on the corresponding item category count within the set of eligible items;
  - selecting items of the set of eligible items within the corresponding item category;
  - computing a potential click value based on a median click value of each selected item included in the item attributes;
  - computing a normalized relevance value based on a mean relevance of selected items included in the item attributes; and
  - computing a number of category display items based on the potential click value and the normalized relevance value; and
- transmitting the number of category display items for each category of the set of item categories to the user device for display on a user interface.

16. The non-transitory computer-readable medium of claim 15, wherein the navigation includes, in response to receiving a user selection, prompting the user interface of the user device to display a basket page, displaying the set of basket items.

17. The non-transitory computer-readable medium of claim 15, wherein the operations further comprise generating the set of eligible items by generating a set of recommended items based on a similarity score between each item stored in an item database and the set of basket items.

18. The non-transitory computer-readable medium of claim 15, wherein the set of attributes of each item of the set of eligible items include an item category, a cost per click value, and a relevance value.

19. The non-transitory computer-readable medium of claim 18, wherein the relevance value is at least one of a relevance to the item category and a relevance to the set of basket items.

20. The non-transitory computer-readable medium of claim 15, wherein the set of item categories include a repurchase category, a low consideration complimentary category, and a high consideration complimentary category.

* * * * *